United States Patent
Chou et al.

(10) Patent No.: US 8,154,532 B2
(45) Date of Patent: Apr. 10, 2012

(54) LCD DISPLAY WITH PHOTO SENSOR TOUCH FUNCTION

(75) Inventors: Yu-Hui Chou, Hsinchu (TW); Hsueh-Ying Huang, Hsinchu (TW); Chung-Hung Yang, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 741 days.

(21) Appl. No.: 12/251,981

(22) Filed: Oct. 15, 2008

(65) Prior Publication Data

US 2010/0090996 A1   Apr. 15, 2010

(51) Int. Cl.
*G06F 3/042* (2006.01)

(52) U.S. Cl. ............... 345/175; 345/173; 178/18.09; 178/18.11

(58) Field of Classification Search .......... 345/81, 345/104, 173–175, 179, 182–183, 204–207; 178/18.09, 18.11, 18.01–18.03, 20.01–20.04; 349/12
See application file for complete search history.

(56) References Cited

U.S. PATENT DOCUMENTS

| 7,009,663 | B2 * | 3/2006 | Abileah et al. ............... 349/12 |
| 7,800,602 | B2 * | 9/2010 | Choi et al. ............... 345/207 |
| 2003/0156230 | A1 | 8/2003 | Boer et al. |
| 2006/0055828 | A1 * | 3/2006 | Henry et al. ............... 348/674 |
| 2006/0109222 | A1 | 5/2006 | Lee et al. |
| 2007/0109239 | A1 * | 5/2007 | den Boer et al. ............... 345/87 |
| 2007/0176905 | A1 * | 8/2007 | Shih et al. ............... 345/173 |
| 2007/0296688 | A1 | 12/2007 | Nakamura et al. |
| 2008/0122803 | A1 * | 5/2008 | Izadi et al. ............... 345/175 |
| 2008/0149811 | A1 * | 6/2008 | Kim ............... 250/205 |
| 2008/0192237 | A1 | 8/2008 | Yamamoto |

FOREIGN PATENT DOCUMENTS

| JP | 2006039242 A | 2/2006 |
| JP | 2007183706 A | 7/2007 |
| JP | 2008186374 A | 8/2008 |
| WO | 2007058924 A2 | 5/2007 |

* cited by examiner

*Primary Examiner* — Amare Mengistu
*Assistant Examiner* — Dmitriy Bolotin
(74) *Attorney, Agent, or Firm* — Morris Manning & Martin LLP; Tim Tingkang Xia, Esq.

(57) ABSTRACT

The present invention relates to a method for driving a display device having a panel having a display region and a peripheral region, a first photosensor member formed in the display region, and a second photosensor member formed in the peripheral region. In one embodiment, the method includes the steps of measuring an intensity of ambient light by the second photosensor member, and driving the first photosensor member according to the measured intensity of the ambient light, so as to sense a change of incident light caused by a touch on the display region.

17 Claims, 10 Drawing Sheets

LCD DISPLAY WITH PHOTO SENSOR TOUCH FUNCTION

FIELD OF THE INVENTION

The present invention relates generally to a liquid crystal display (LCD), and more particularly to an LCD that utilizes the intensity of ambient light to optimize the sensitivity of a photosensor in detection of touch information and methods of driving same.

BACKGROUND OF THE INVENTION

Touch sensing technology capable of providing a natural interface between an electronic system and user has found widespread applications in a variety of fields, for example, in mobile phones, personal digital assistants (PDAs), automatic teller machines (ATMs), game machines, medical devices, liquid crystal display (LCD) devices, light emitting diode (LED) devices, plasma display panel (PDP) devices, computing devices, and the like, where a user may input desired information and/or operate the electronic system through a touch sensing device associated with the electronic system.

Recently, an LCD incorporating touch function has been developed. Those touch functions senses the pressure or capacitance difference caused by a touch of a finger or a stylus and provide electrical signals corresponding thereto for the LCD. The external device determines whether and where a touch exists on a display panel of the LCD based on the processed electrical signals and may return image signals to the LCD, which are generated based on the information. Although the touch function may be provided on an external device such as a touch screen panel to be attached to the LCD, it may increase the thickness, the weight and the additional cost of the LCD. A photosensor incorporated into an LCD may be implemented as a TFT disposed in a pixel displaying an image. However, such a photosensor causes many errors in photosensing responsive to touch since an output characteristic of the photosensor varies with ambient circumstances, i.e., an intensity of ambient light, a luminance of a backlight, temperature, and so on. Accordingly, the LCD device may perceive no touch although a touch has occurred or may perceive a touch although no touch has occurred.

Therefore, a heretofore unaddressed need exists in the art to address the aforementioned deficiencies and inadequacies.

SUMMARY OF THE INVENTION

The present invention, in one aspect, relates to an LCD. In one embodiment, the LCD includes a panel having a display region and a peripheral region that is adjacent the display region, the panel having a plurality of pixels spatially arranged in the form of a matrix in the display region for displaying an image, a first photosensor member formed in the display region for sensing a change of incident light caused by a touch on the display region, wherein the first photosensor member comprises at least one photo transistor having a gate, a source and a drain, and is characterized with a sensitivity for sensing the change of the incident light, a second photosensor member formed in the peripheral region for measuring an intensity of ambient light and generating an ambient light sensing signal corresponding to the measured intensity of the ambient light, and a sensor controller electrically coupled to the first photosensor member and the second photosensor member for receiving the ambient light sensing signal from the second photosensor member and regulating voltages Vg and Vs respectively applied to the gate and the source of the at least one photo transistor of the first photosensor member according to the measured intensity of the ambient light, so as to operate the first photosensor member at an optimal sensitivity.

The LCD further includes a backlight for illuminating the display region of the panel, and a backlight controller electrically coupled to the backlight and the second photosensor member for controlling the luminance of the backlight, where the backlight controller is configured such that when the measured intensity of the ambient light is substantially equal to the threshold, the luminance of the backlight is increased to a level. Additionally, the LCD may have a lookup table (LUT) stored in a memory device in communication with the sensor controller, and wherein the LUT contains a number of intensity values of the ambient light, and corresponding values of the voltage difference Vgs for which the first photosensor member operates at the optimal sensitivity.

In one embodiment, the first photosensor member further comprises at least one storage capacitor Cst1 having a first terminal and a second terminal electrically coupled to the source and the drain of the at least one photo TFT, respectively, for storing charges generated by the at least one photo TFT responsive to an amount of the incident light, and at least one readout TFT having a gate, a source and a drain electrically coupled to a gate line, the drain of the at least one photo TFT, and a readout line, respectively, for outputting a signal corresponding to the charges stored in the at least one storage capacitor Cst1. The at least one photo transistor comprises a TFT.

The sensitivity of the first photosensor member varies with the intensity of the ambient light and the voltage difference, Vgs, between the gate and the source of the at least one photo transistor, wherein Vgs=(Vg−Vs).

In one embodiment, the first photosensor member is operably switchable between a reflective mode of operation and a shadow mode of operation according to the ambient light sensing signal generated by the second photosensor member. When the measured intensity of the ambient light is substantially less than a threshold, the first photosensor member is configured to operate in the reflective mode of operation. When the measured intensity of the ambient light is substantially greater than the threshold, the first photosensor member is configured to operate in the shadow mode of operation. When the measured intensity of the ambient light is substantially equal to the threshold, the luminance of the backlight is increased to a desired level so that the first photosensor member operates in the reflective mode of operation.

In one embodiment, the second photosensor member comprises one or more amorphous silicon thin film transistors or photodiodes.

In another aspect, the present invention relates to a method for driving an LCD. In one embodiment, the method includes the step of providing an LCD that has a panel having a display region and a peripheral region that is adjacent the display region, the panel having a plurality of pixels spatially arranged in the form of a matrix in the display region for displaying an image, a first photosensor member formed in the display region for sensing a change of incident light caused by a touch on the display region, wherein the first photosensor member comprises at least one photo transistor having a gate, a source and a drain, and is characterized with a sensitivity for sensing the change of the incident light, a second photosensor member formed in the peripheral region, and a sensor controller electrically coupled to the first photosensor member and the second photosensor member.

Furthermore, the method includes the steps of measuring the intensity of ambient light and generating an ambient light sensing signal corresponding to the measured intensity of the ambient light by the second photosensor member, receiving the ambient light sensing signal from the second photosensor member by the sensor controller, regulating voltages Vg and Vs according to the measured intensity of the ambient light by the sensor controller, and applying the regulated voltages Vg and Vs respectively to the gate and the source of the at least one photo transistor of the first photosensor member, so as to operate the first photosensor member at an optimal sensitivity.

In one embodiment, the regulating step has the steps of looking up an LUT stored in a memory device in communication with the sensor controller, and wherein the LUT contains a number of intensities values of the ambient light, and corresponding values of the voltage difference Vgs for which the first photosensor member operates at the optimal sensitivity, wherein Vgs=(Vg−Vs), and outputting the voltages Vg and Vs such that the voltage difference Vgs is corresponding to the measured intensity of the ambient light.

In yet another aspect, the present invention relates to a method for driving a display device having a panel having a display region and a peripheral region, a first photosensor member formed in the display region, and a second photosensor member formed in the peripheral region. In one embodiment, the method includes the steps of measuring an intensity of ambient light by the second photosensor member, and driving the first photosensor member according to the measured intensity of the ambient light, so as to sense a change of incident light caused by a touch on the display region.

In one embodiment, the first photosensor member comprises at least one photo transistor having a gate, a source and a drain, and is characterized with a sensitivity for sensing the change of the incident light. The first photosensor member is operably switchable between a reflective mode of operation and a shadow mode of operation according to the measured intensity of the ambient light.

In one embodiment, the driving step includes the steps of looking up an LUT containing a number of intensities values of the ambient light, and corresponding values of the voltage difference Vgs for which the first photosensor member operates at the optimal sensitivity, wherein Vgs=(Vg−Vs), regulating voltages Vg and Vs according to the measured intensity of the ambient light, and applying the regulated voltages Vg and Vs respectively to the gate and the source of the at least one photo transistor of the first photosensor member, so as to operate the first photosensor member with an optimal sensitivity.

In another embodiment, the driving step includes the step of comparing the measured intensity of the ambient light with a threshold.

When the measured intensity of the ambient light is substantially greater than the threshold, the driving step further comprises the steps of looking up the LUT containing a number of intensities values of the ambient light, and corresponding values of the voltage difference Vgs for which the first photosensor member operates at the optimal sensitivity, wherein Vgs=(Vg−Vs), regulating voltages Vg and Vs according to the measured intensity of the ambient light, and applying the regulated voltages Vg and Vs respectively to the gate and the source of the at least one photo transistor of the first photosensor member, so as to operate the first photosensor member with an optimal sensitivity.

When the measured intensity of the ambient light is substantially less than the threshold, the driving step further comprises the steps of switching the first photosensor member to the reflective mode of operation, looking up the LUT storing a number of intensities values of the ambient light, and corresponding values of the voltage difference Vgs for which the first photosensor member operates at the optimal sensitivity, wherein Vgs=(Vg−Vs), regulating voltages Vg and Vs according to the measured intensity of the ambient light, and applying the regulated voltages Vg and Vs respectively to the gate and the source of the at least one photo transistor of the first photosensor member, so as to operate the first photosensor member with an optimal sensitivity.

When the measured intensity of the ambient light is substantially equal to the threshold, the driving step further comprises the steps of increasing the luminance of backlight a desired level, switching the first photosensor member to the reflective mode of operation, looking up the LUT containing a number of intensities values of the ambient light, and corresponding values of the voltage difference Vgs for which the first photosensor member operates at the optimal sensitivity, wherein Vgs=(Vg−Vs), regulating voltages Vg and Vs according to the measured intensity of the ambient light; and applying the regulated voltages Vg and Vs respectively to the gate and the source of the at least one photo transistor of the first photosensor member, so as to operate the first photosensor member with an optimal sensitivity.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
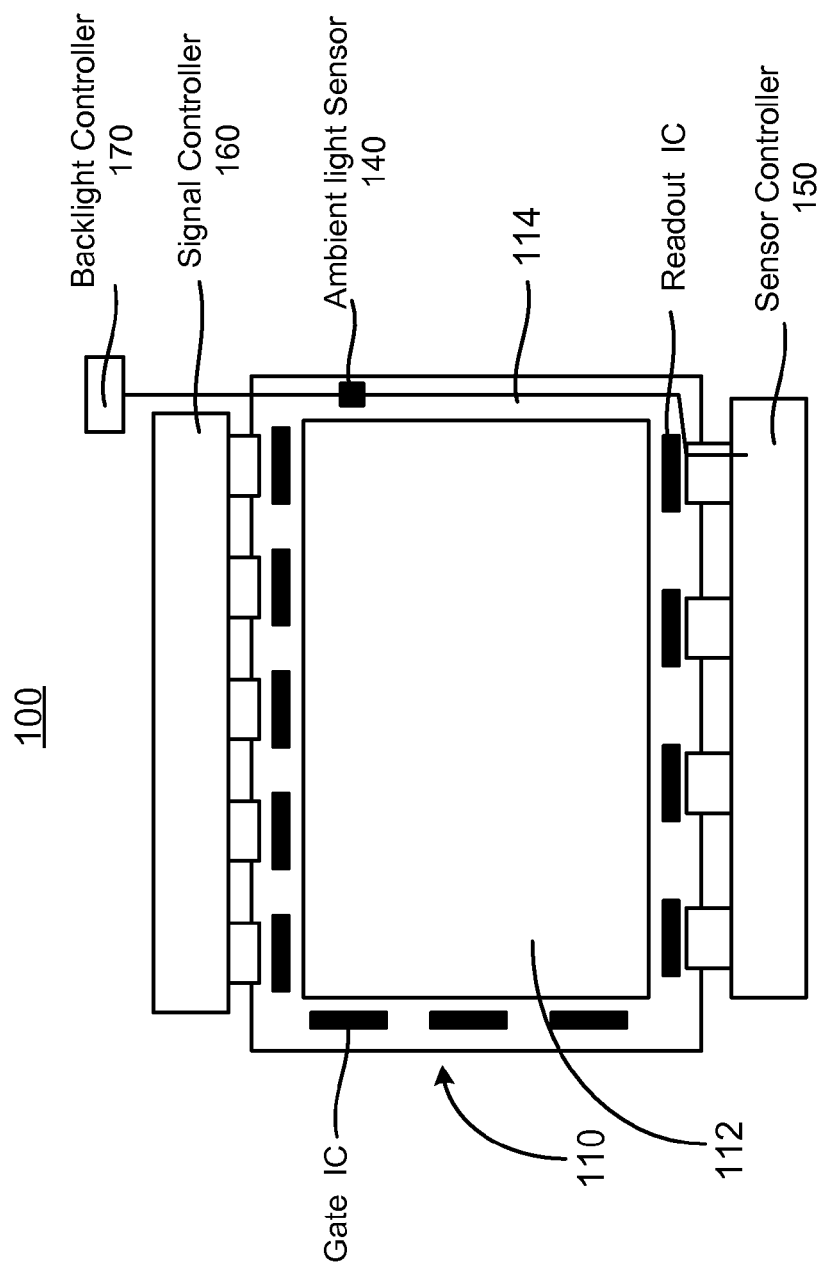
FIG. 1 shows schematically a layout of a liquid crystal display (LCD) according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present invention in conjunction with the accompanying drawings in FIGS. 1-10. In accordance with the purposes of this invention, as embodied and broadly described herein, this invention, in one aspect, relates to an LCD that utilizes the intensity of ambient light to optimize the sensitivity of a touch sensing device such as photosensor in detection of touch information on the LCD and methods of driving same.

Figure 2:
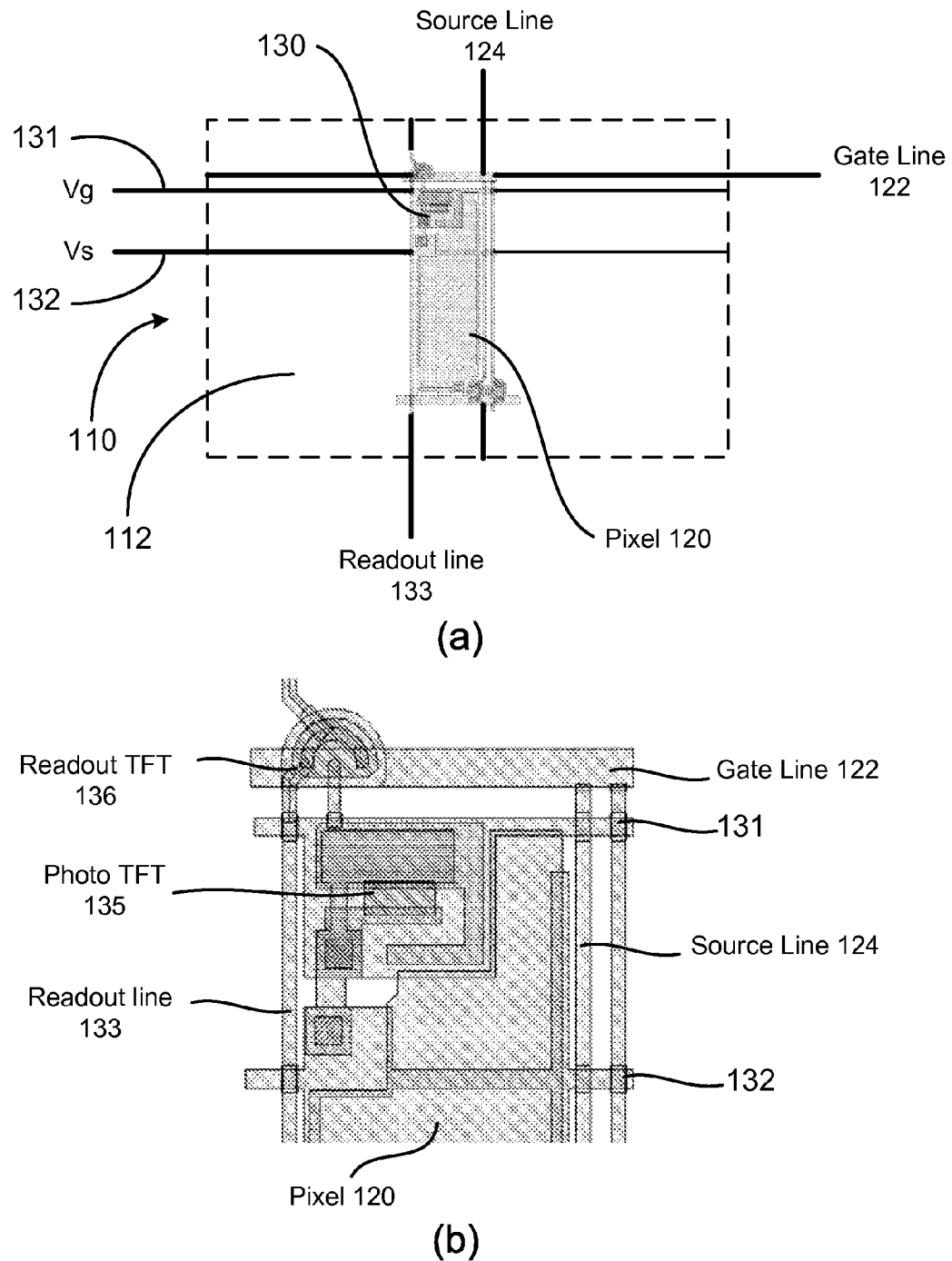
FIG. 2 shows schematically a pixel of the LCD shown in FIG. 1: (a) a layout of the pixel in a display region, and (b) an enlarged review of the pixel having a photosensor member.
Figure 3:
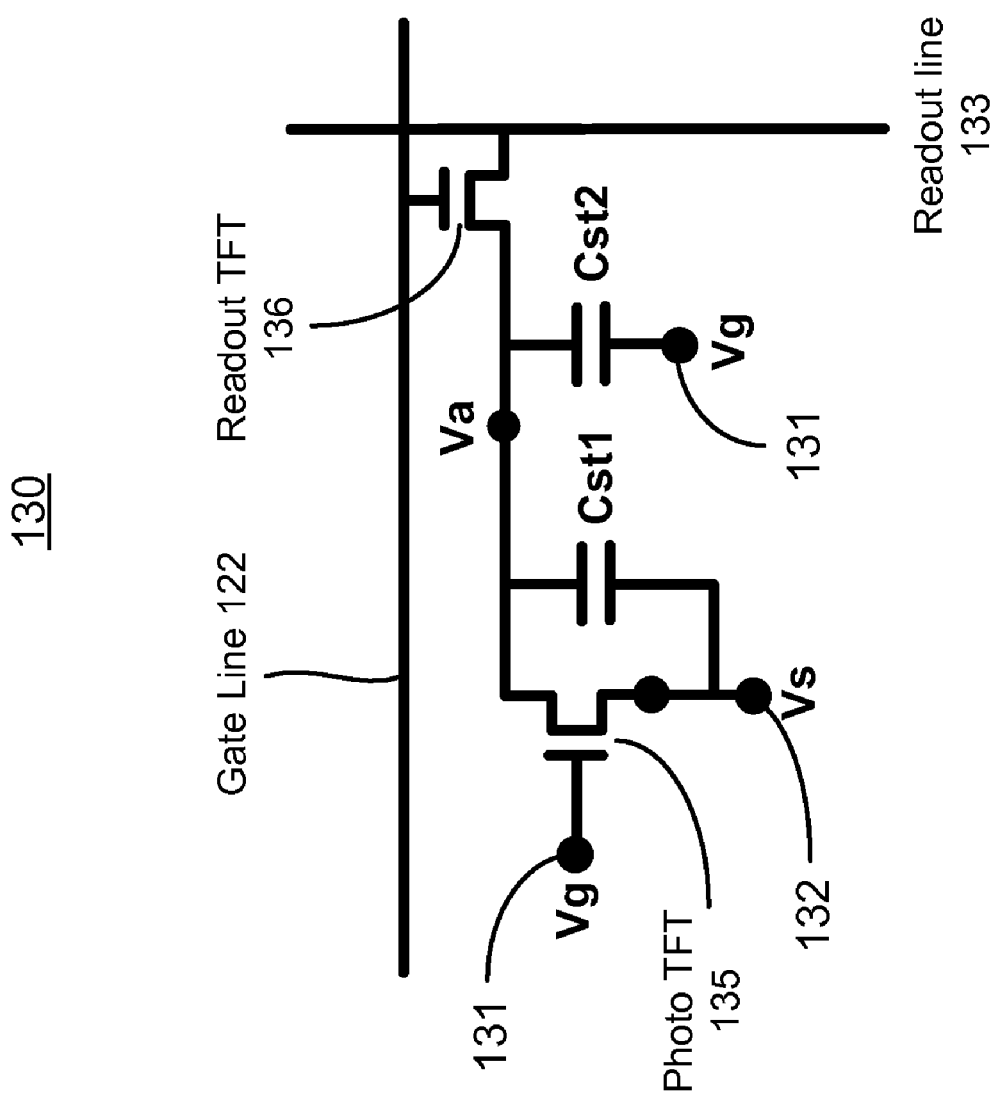
FIG. 3 shows schematically a circuit of the photosensor member shown in FIG. 2.

FIGS. 1-3 show schematically an LCD 100 with an integrated touch sensing device and an ambient light sensor according to one embodiment of the present invention. The LCD 100 includes an LCD panel 110 having a display region 112 and a peripheral region 114 that is adjacent the display region 112. The LCD panel 110 includes a lower substrate and an upper substrate and a liquid crystal (LC) layer disposed between the lower and upper substrates. The lower and upper substrates are provided with a plurality of pixel electrodes 120 and a common electrode, respectively. The plurality of pixel electrodes 120 is arranged in a form of matrix in the display region 112. FIG. 2 shows a layout of only one pixel electrode 120. The pixel electrode 120 is electrically coupled by a gate line 122 arranged along a row direction and a source line 124 arranged along a column direction that is perpendicular to the row direction. Gate and data signals controlled by a signal controller 160 are input to the pixel electrode 120 through the gate line 122 and the source line 124, respectively. The LCD 100 displays desired images by adjusting the strength of an electric field applied to the LC layer to control a transmittance of light passing through the lower and upper substrates. Additionally, the LCD is illumined by a backlight for the image display. A backlight controller 170 is used to regulate the luminance of the backlight.

Furthermore, the LCD 100 has a first photosensor member 130 formed in the display region 112 for sensing a change of incident light caused by a touch on the display region, and generating an electrical signal responsive to the change. In this embodiment, as shown in FIG. 2, the first photosensor member 130 is formed along with the pixel 120. As shown in FIGS. 2 and 3, the first photosensor member 130 includes at least one photo transistor 135 having a gate electrically coupled to a first supply voltage line 131 for receiving a first supply voltage, Vg, a source electrically coupled to a second supply voltage line 132 for receiving a second supply voltage, Vs, and a drain, and at least one storage capacitor Cst1 having a first terminal and a second terminal electrically coupled to the source and the drain of the at least one photo TFT 135, respectively, for storing charges generated by the at least one photo TFT 135 responsive to an amount of the incident light. The at least one photo TFT comprises an a-Si thin film transistor. The first photosensor member 130 may also include a second storage capacitor Cst2 having a first terminal and a second terminal electrically coupled to the first supply voltage line 131 and the drain of the at least one photo TFT 135, respectively. Additionally, the first photosensor member 130 includes at least one readout TFT 136 having a gate, a source and a drain, where the gate, source and drain are electrically coupled to the gate line 122, the drain of the at least one photo TFT 135, and a readout line 133, respectively. The at least one readout TFT 136 is adapted for outputting a signal corresponding to the charges stored in the at least one storage capacitor Cst1.

The first photosensor member 130 is configured to operate a reflective mode of operation or a shadow mode of operation according to the intensity of the ambient light. In the shadow mode, the first photosensor member 130 detects the shadow which is cast by the object coming into contact with the screen. This mode of operation is affected by the level of ambient visible lighting and if it is too dark there may be no shadow and so the touch screen will fail to detect touch events. In the reflective mode, the touch screen includes a light source (or illuminant) which illuminates objects which are brought into contact with the screen. The first photosensor member 130 detects the light reflected back by the objects. Further, the first photosensor member 130 may be configured to operably switch between the reflective mode of operation and the shadow mode of operation depending upon the intensity of the ambient light. For example, when the intensity of the ambient light is substantially less than a threshold, the first photosensor member 130 operates in the reflective mode of operation. When the intensity of the ambient light is substantially greater than the threshold, the first photosensor member 130 operates in the shadow mode of operation. When the intensity of the ambient light is substantially equal to the threshold, the luminance of the backlight is increased to a desired level, and the first photosensor member 130 operates in the reflective mode of operation.

The first photosensor member 130 is characterized with a sensitivity for sensing the change of the incident light. In practice, the sensitivity of the first photosensor member 130 varies with ambient circumstances, particularly, with an intensity of ambient light, and a luminance of a backlight. In one embodiment, the sensitivity of the first photosensor member 130 is a function of the intensity of the ambient light and the voltage difference, Vgs, between the gate and the source of the at least one photo transistor, where Vgs=(Vg−Vs).

Figure 4:
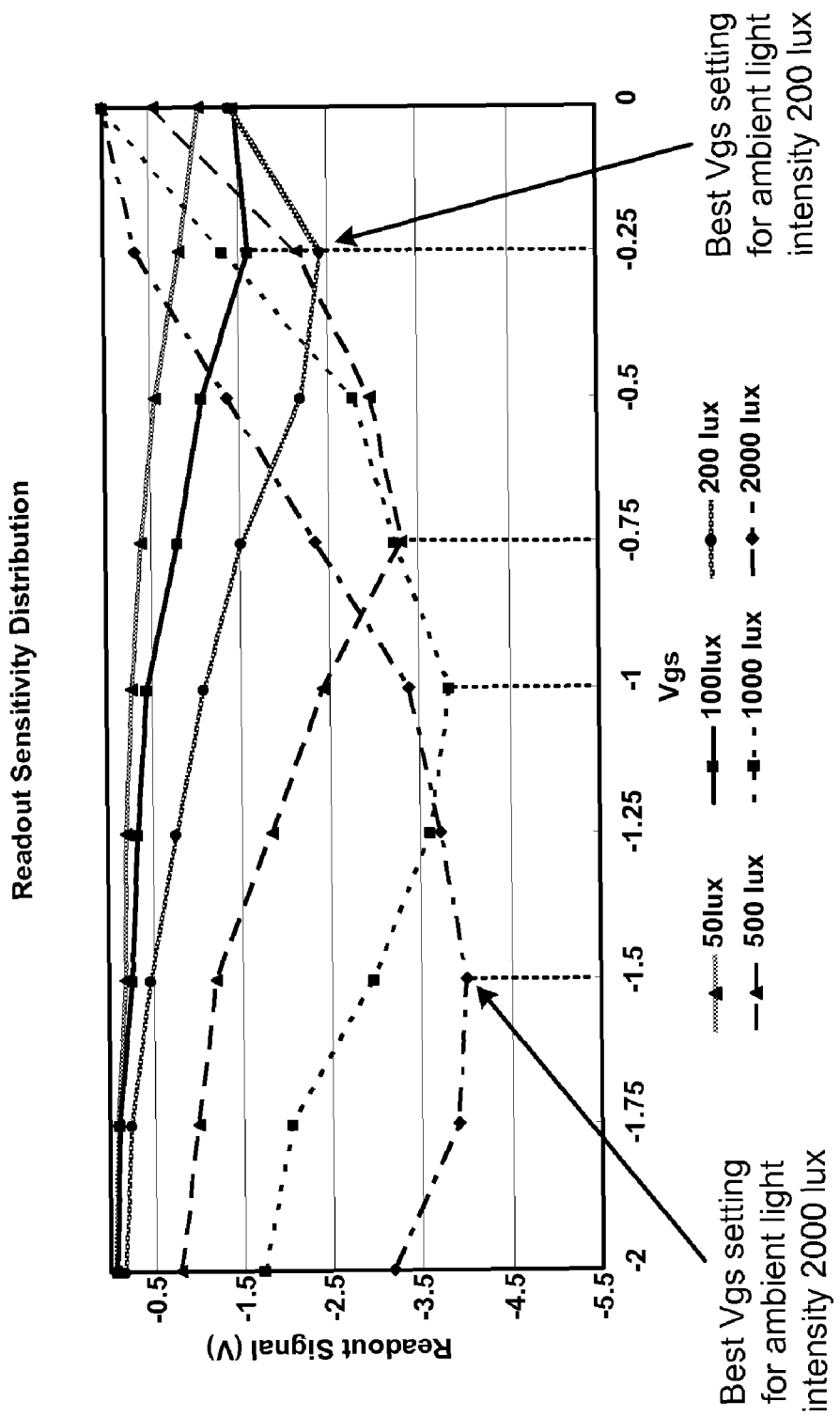
FIG. 4 shows a readout sensitivity distribution of a photosensor member for various intensities of incident light according to one embodiment of the present invention.

Referring FIG. 4, a readout sensitivity distribution of the photosensor member for various intensities of incident light is shown according to one embodiment of the present invention. In this embodiment, the first photosensor member is configured to operate in the shadow mode. It is evident that for different ambient light intensities, the corresponding values of Vgs for the first photosensor member to be operated with the optimal sensitivity are different, which is listed in Table 1. For example, for the ambient light having an intensity of 2000 Lux, the voltage difference Vgs between the gate and source of the photo TFT needs to be set at −1.5 V in order to operate the first photosensor member with the optimal sensitivity.

Figure 5:
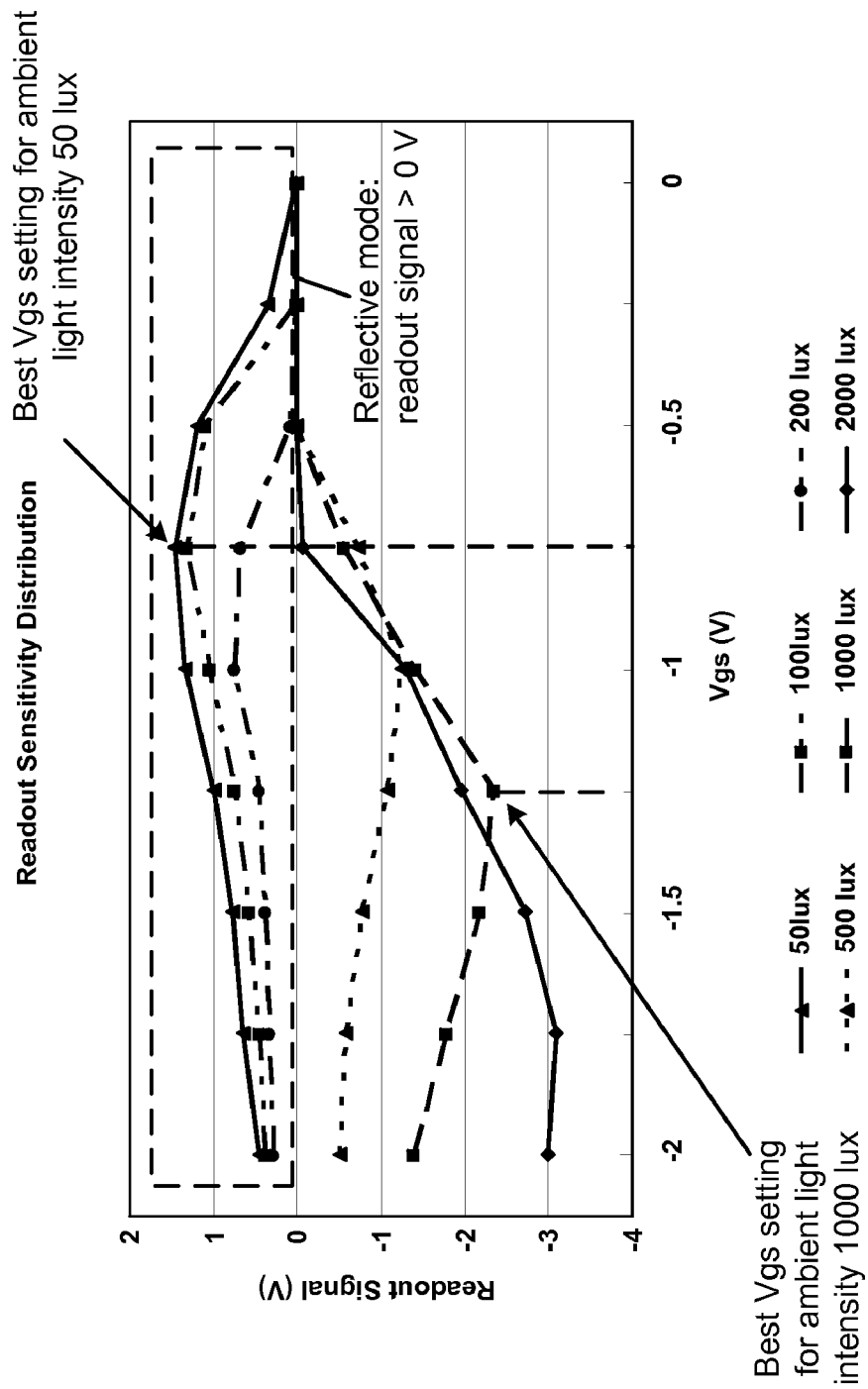
FIG. 5 shows a readout sensitivity distribution of the photosensor member for various intensities of incident light according to another embodiment of the present invention.

FIG. 5 shows a readout sensitivity distribution of the first photosensor member for various intensities of incident light is shown according to another embodiment of the present invention. In this embodiment, the first photosensor member is configured to switchably operate in the shadow mode or the reflective mode, depending upon the intensity of the ambient light. The threshold value for the intensity of the ambient light is about 250 Lux. When the intensity of the ambient light is substantially less than the threshold value, the first photosensor member operates in the reflective mode. When the intensity of the ambient light is substantially greater than the threshold value, the first photosensor member operates in the shadow mode. For example, when the intensity of the ambient light is about 50 Lux, the first photosensor member operates in the reflective mode, and the best Vgs setting is about −0.75. However, when the intensity of the ambient light is about 1000 Lux, the first photosensor member operates in the shadow mode, and the best Vgs setting is about −1.25.

TABLE 1

Ambient light intensities and the corresponding Vgs for the first photosensor member to be operated with the optimal sensitivity.

| Ambient Light Intensity (Lux) | Vgs (V) |
|---|---|
| 50 | 0 |
| 100 | −0.25 |
| 200 | −0.25 |
| 500 | −0.75 |
| 1000 | −1.00 |
| 2000 | −1.50 |

The first photosensor member may be calibrated to find the intensity values of the ambient light, and corresponding values of the voltage difference Vgs for which the first photosensor member operates at the optimal sensitivity, which form an LUT stored in a memory device or database in communication with the sensor controller for use of driving the LCD.

Additionally, if the intensity of the ambient light is around the threshold (a critical ambient light condition), the readout signal in both reflection mode and shadow mode would be low. So in this condition, the backlight luminance needs to be adjusted to a higher level, so that the first photosensor member can be operated at reflection mode.

Therefore, to optimize the performance of the first photosensor member, a photosensor may be used to measure/monitor the intensity of the ambient light, then the measured intensity of the ambient light is used to set the best Vgs corresponding to the measured intensity of the ambient light.

Referring back to FIG. 1, according the present invention, the LCD 100 includes a second photosensor member 140 formed in the display region 112 of the panel 110 for measuring/monitoring an intensity of ambient light, and a sensor controller 150 electrically coupled to the first photosensor member 130 and the second photosensor member 140 for receiving the measured intensity of the ambient light from the second photosensor member 140 and regulating voltages Vg 131 and Vs 132, according to the measured intensity of the ambient light, which are respectively applied to the gate and the source of the at least one photo transistor 135 of the first photosensor member 130 so as to operate the first photosensor member 130 at an optimal sensitivity.

Additionally, the second photosensor member 140 is also electrically coupled to the backlight controller 170. The backlight controller is configured such that when the measured intensity of the ambient light is substantially equal to the threshold, the luminance of the backlight is increased to a level so that the first photosensor member 130 operates in the reflective mode of operation. The second photosensor member 140 includes one or more amorphous silicon thin film transistors or photodiodes.

Figure 6:
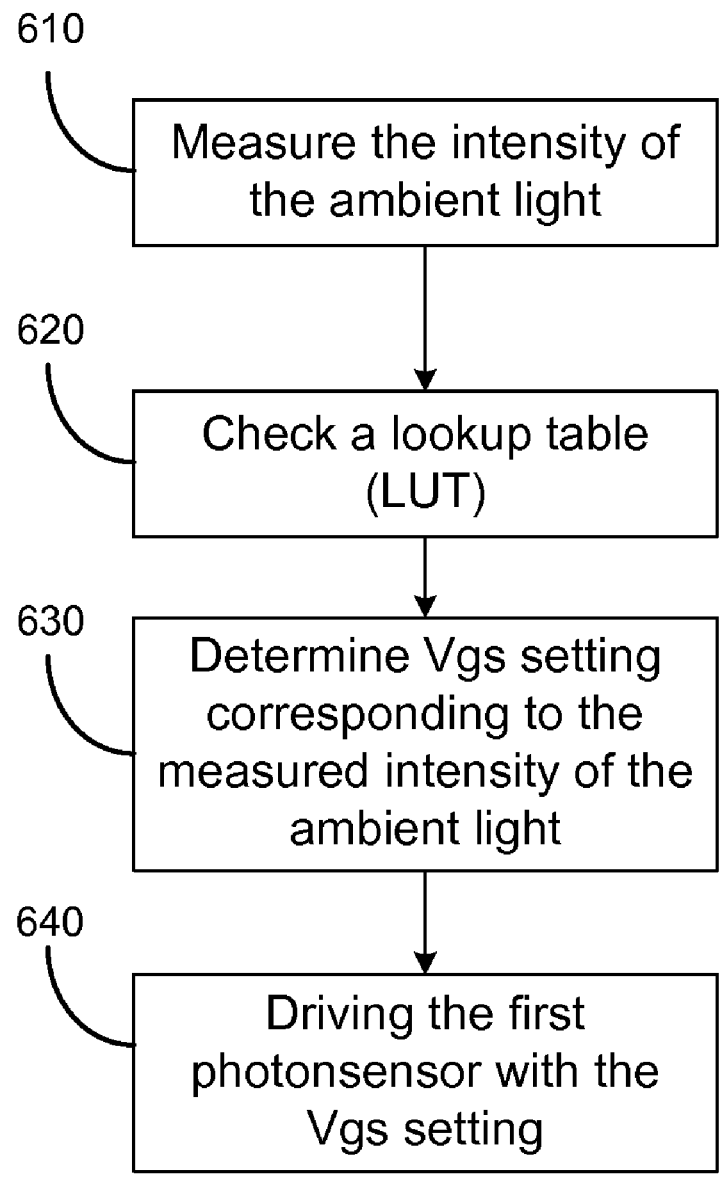
FIG. 6 shows a flowchart related to a method for driving an LCD according to one embodiment of the present invention.

Referring to FIG. 6, a flowchart related to a method 600 for driving an LCD is shown according to one embodiment. The method 600 includes the following steps: at step 610, the intensity of the ambient light is measured by the second photosensor member. The measured intensity of the ambient light is sent to the sensor controller. The sensor controller processes the received signal of the measured intensity of the ambient light and look up an LUT, which is stored in a memory device or database in communication with the sensor controller, at step 620, and determines Vgs setting according to the measured intensity of the ambient light at step 630. At step 640, the determined Vgs setting is used to drive the first photosensor member.

Figure 7:
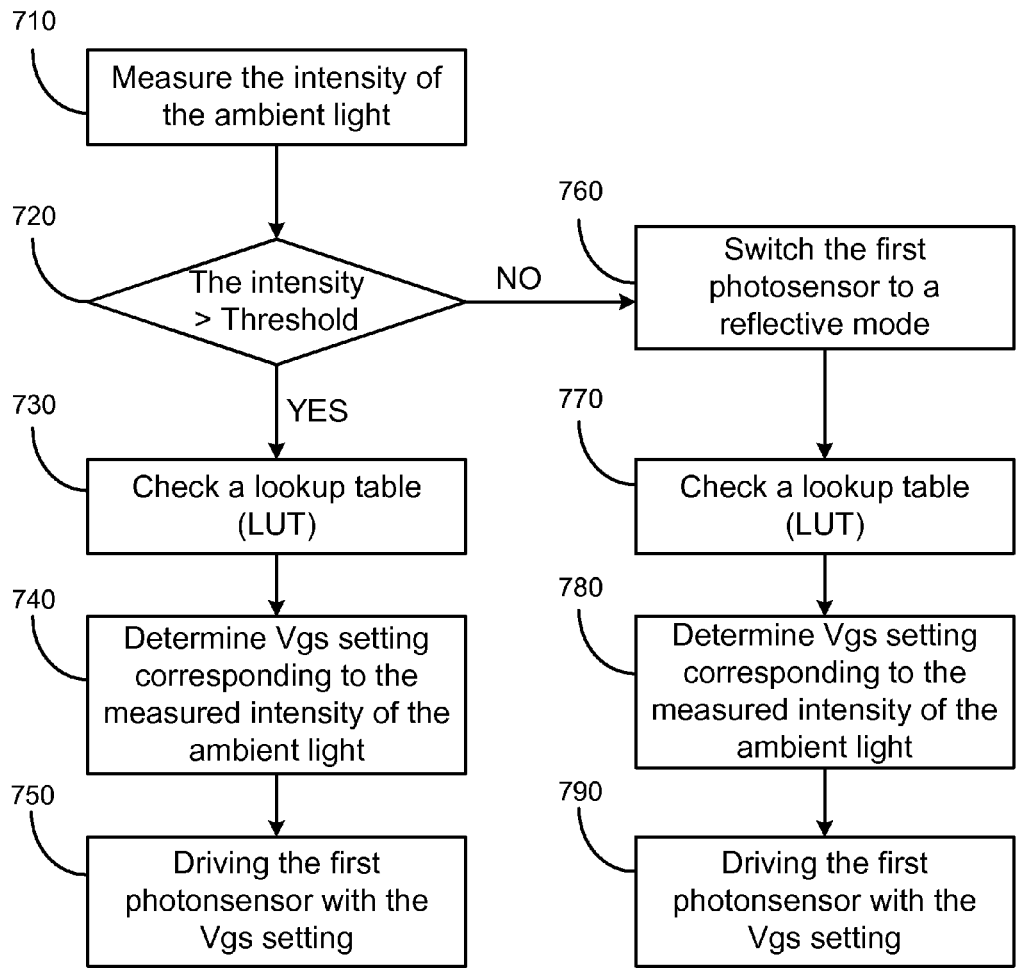
FIG. 7 shows a flowchart related to a method for driving an LCD according to another embodiment of the present invention.

FIG. 7 shows a flowchart related to a method 700 for driving an LCD according to another embodiment. In this embodiment, the first photosensor member is configured to operate a reflective mode of operation or a shadow mode of operation according to the measured intensity of the ambient light. At step 710, the intensity of the ambient light is measured by the second photosensor member. The measured intensity of the ambient light is sent to the sensor controller. The sensor controller processes the received signal of the measured intensity of the ambient light to determinate whether the measured intensity of the ambient light is substantially greater than a threshold value, or not, at step 720. If the measured intensity of the ambient light is substantially greater than a threshold value, the sensor controller looks up an LUT at step 730, and determines Vgs setting according to the measured intensity of the ambient light at step 740. At step 750, the determined Vgs setting is used to drive the first photosensor member. If the measured intensity of the ambient light is not substantially greater than a threshold value, the first photosensor member is switched to the reflective mode at step 760. Then, the sensor controller looks up the LUT at step 770, and determines Vgs setting according to the measured intensity of the ambient light at step 780. At step 790, the determined Vgs setting is used to drive the first photosensor member.

Figure 8:
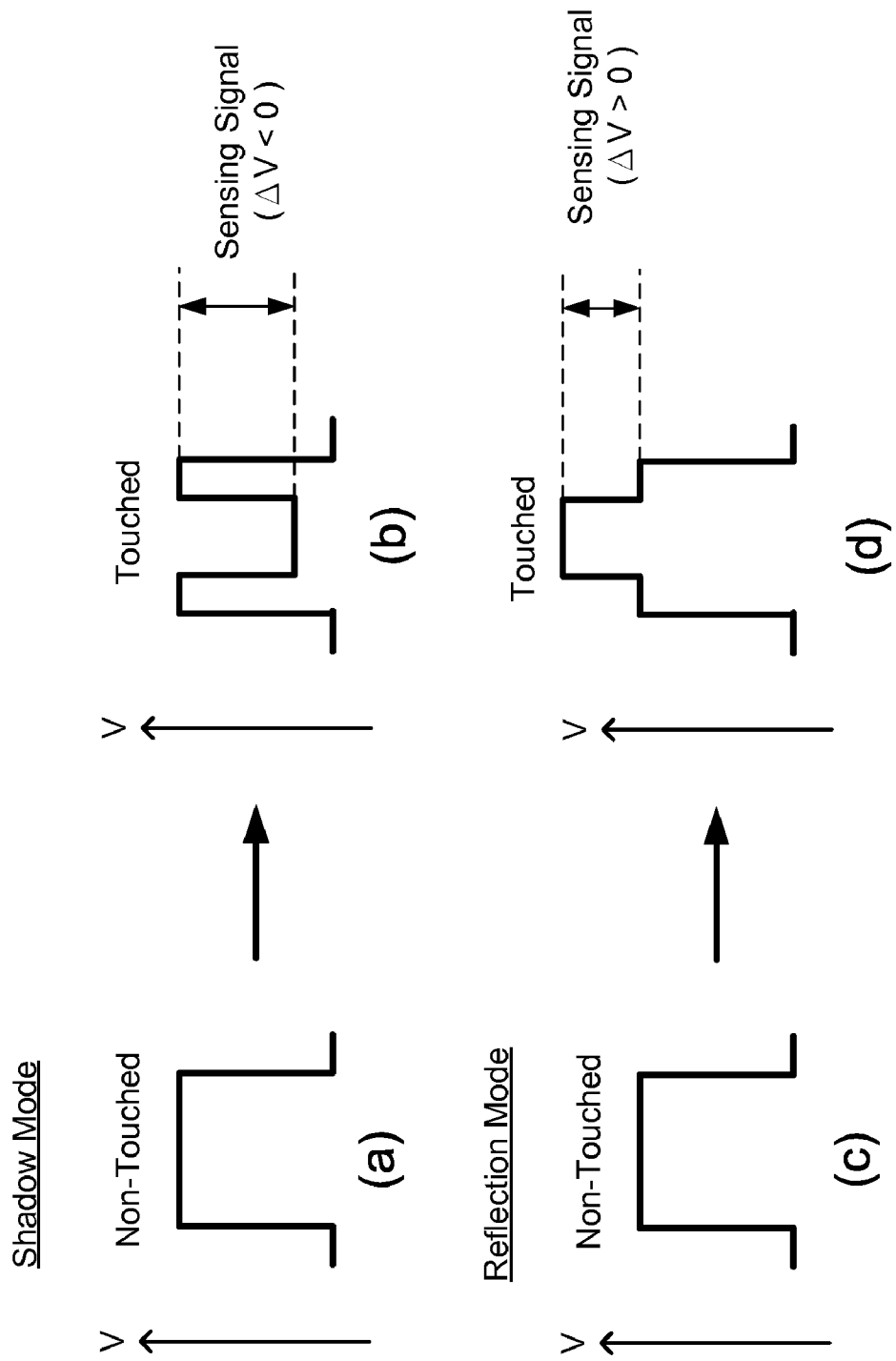
FIG. 8 shows readout signals of the first photosensor member according to one embodiment of the present invention: (a) the readout signals without a touch in the shadow mode, (b) the readout signals with a touch in the shadow mode, (c) the readout signals without a touch in the reflective mode, and (d) the readout signals with a touch in the reflective mode.

FIG. 8 shows readout signals of the first photosensor member according to one embodiment of the present invention. (a) and (c) are corresponding to the readout signals of the first photosensor member in the shadow mode and a reflective mode, respectively, without a touch on the LCD, where the readout signal does not change. (b) and (d) are corresponding to the readout signals of the first photosensor member in the shadow mode and a reflective mode, respectively, responsive to a touch on the LCD. When a touch detected, the readout signal ΔV<0 in the shadow mode, while in the reflective mode, the readout signal ΔV>0.

Figure 9:
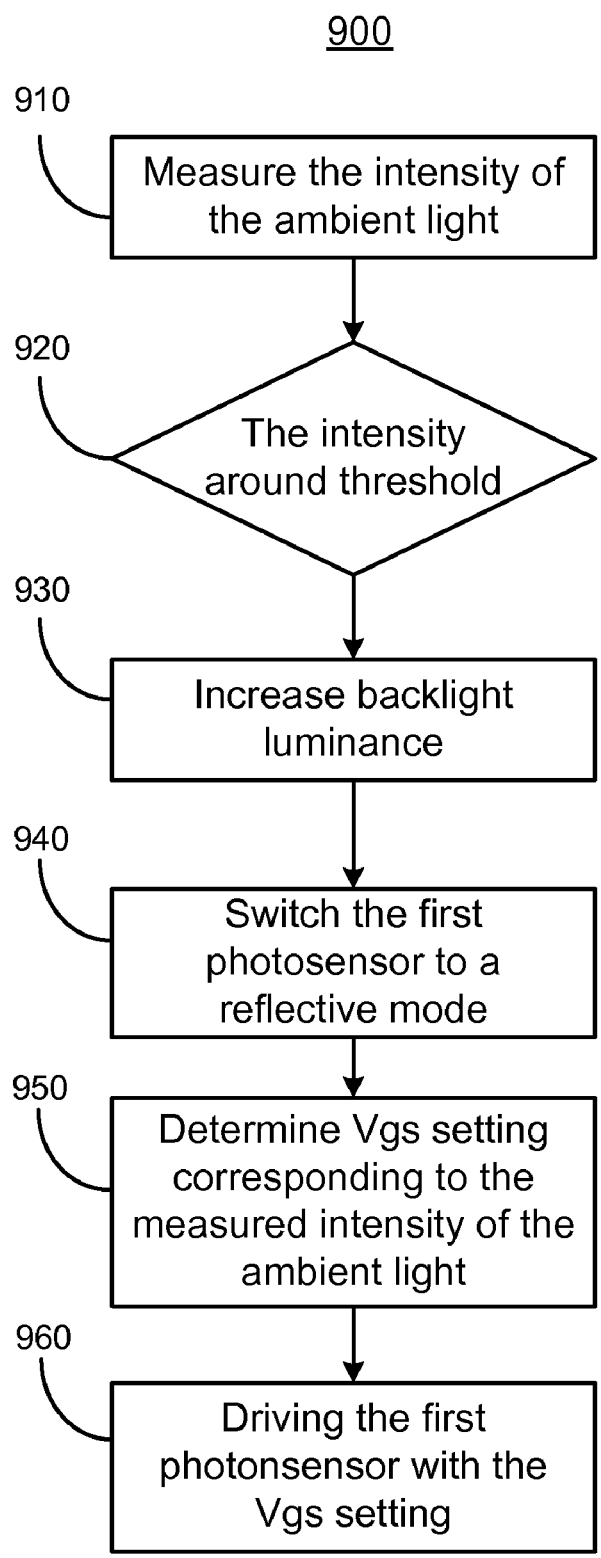
FIG. 9 shows a flowchart related to a method for driving an LCD according to one embodiment of the present invention.

Referring FIG. 9, a flowchart related to a method 900 for driving an LCD is shown according to another embodiment. In this embodiment, the first photosensor member is configured to operate a reflective mode of operation or a shadow mode of operation according to the measured intensity of the ambient light. At step 910, the intensity of the ambient light is measured by the second photosensor member. The measured intensity of the ambient light is sent to the sensor controller. The sensor controller processes the received signal of the measured intensity of the ambient light to determinate whether the measured intensity of the ambient light is substantially around the threshold value, or not, at step 920. If the measured intensity of the ambient light is substantially around threshold value, the luminance of the backlight is increased to a desired level at step 930. At step 940, the first photosensor member is switched to the reflective mode. Then, Vgs setting is determined according to the measured intensity of the ambient light at step 950. At step 960, the determined Vgs setting is used to drive the first photosensor member.

Figure 10:
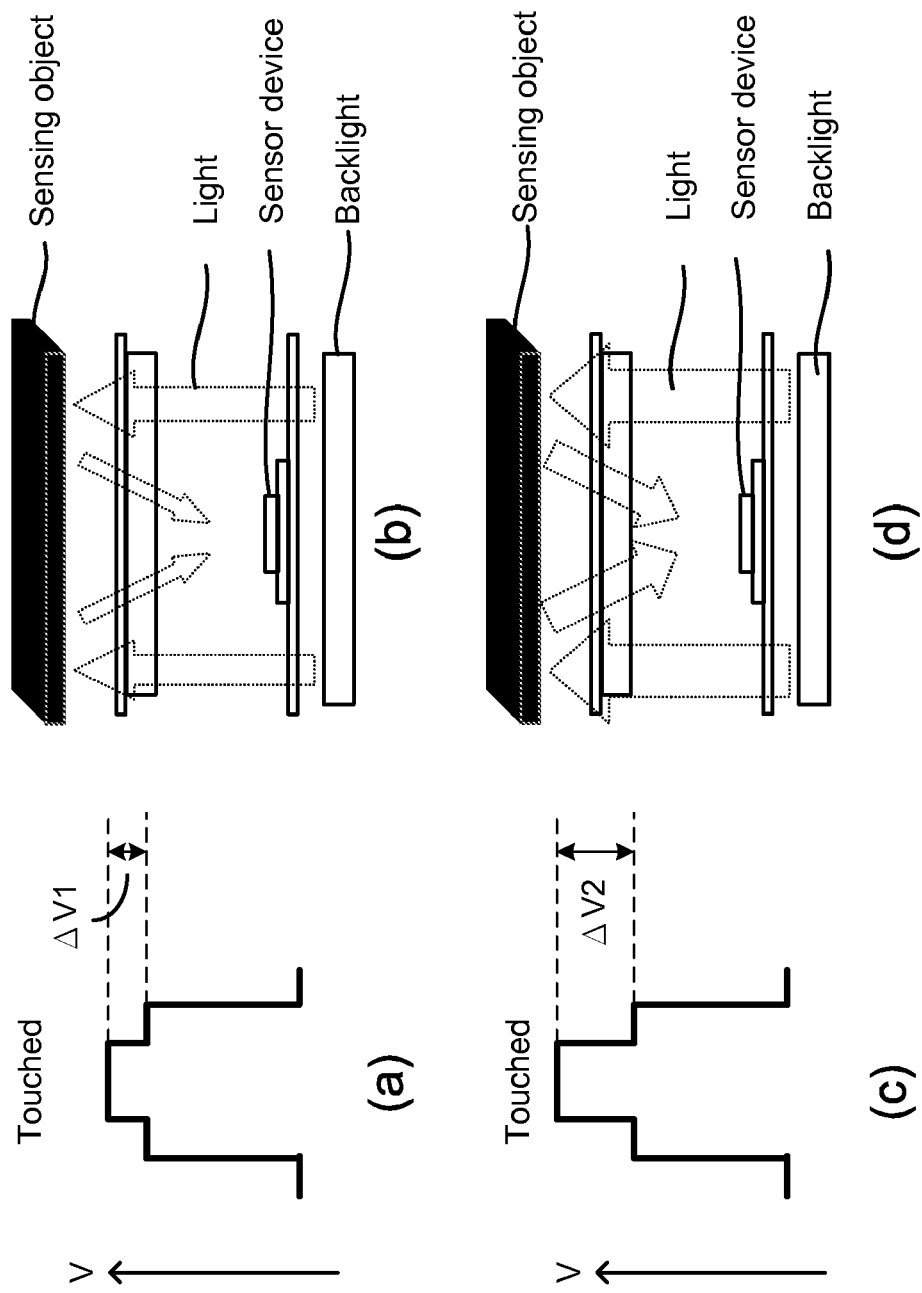
FIG. 10 shows readout signals of a sensor device varying with the intensity of the incident light upon the sensor device: (a) the readout signals with a lower intensity of the incident light, (b) a display having the sensor device with a lower intensity of the incident light, (c) the readout signals with a higher intensity of the incident light, and (d) the display having the sensor device with a higher intensity of the incident light.

FIG. 10 shows readout signals of the sensor device varying with the intensity of the incident light upon the sensor device (the first photosensor member). It is clear that the stronger the intensity of the incident light is, the larger the readout signals of the sensor device is. For example, as shown in FIGS. 10a and 110c, ΔV2>ΔV1, the former is the readout signal of the sensor device of a display with a higher intensity of the incident light (FIG. 10b), while the latter is the readout signal of the sensor device of the display with a lower intensity of the incident light (FIG. 10d).

One aspect of the present invention provides a method for driving a display device having a panel having a display region and a peripheral region, a first photosensor member formed in the display region, and a second photosensor member formed in the peripheral region. In one embodiment, the first photosensor member comprises at least one photo transistor having a gate, a source and a drain, and is characterized with a sensitivity for sensing the change of the incident light. The first photosensor member is operably switchable between a reflective mode of operation and a shadow mode of operation according to the measured intensity of the ambient light.

The method includes the steps of measuring an intensity of ambient light by the second photosensor member, and driving the first photosensor member according to the measured intensity of the ambient light, so as to sense a change of incident light caused by a touch on the display region.

The driving step includes the step of comparing the measured intensity of the ambient light with a threshold.

When the measured intensity of the ambient light is substantially greater than the threshold, the driving step further includes the steps of looking up an LUT, which is stored in a memory device or database and contains a number of intensities values of the ambient light, and corresponding values of the voltage difference Vgs for which the first photosensor member operates at the optimal sensitivity, regulating voltages Vg and Vs according to the measured intensity of the ambient light, and applying the regulated voltages Vg and Vs respectively to the gate and the source of the at least one photo transistor of the first photosensor member, so as to operate the first photosensor member with an optimal sensitivity.

When the measured intensity of the ambient light is substantially less than the threshold, the driving step further includes the steps of switching the first photosensor member to the reflective mode of operation, looking up the LUT, regulating voltages Vg and Vs according to the measured intensity of the ambient light, and applying the regulated voltages Vg and Vs respectively to the gate and the source of the at least one photo transistor of the first photosensor member, so as to operate the first photosensor member with an optimal sensitivity.

When the measured intensity of the ambient light is substantially equal to the threshold, the driving step further includes the steps of increasing the luminance of backlight a desired level, switching the first photosensor member to the reflective mode of operation, looking up the LUT, regulating voltages Vg and Vs according to the measured intensity of the ambient light; and applying the regulated voltages Vg and Vs respectively to the gate and the source of the at least one photo transistor of the first photosensor member, so as to operate the first photosensor member with an optimal sensitivity.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A liquid crystal display (LCD), comprising:
   (a) a panel having a display region and a peripheral region adjacent the display region, the panel having a plurality of pixels spatially arranged in the form of a matrix in the display region for displaying an image;
   (b) a first photosensor member formed in the display region for sensing a change of incident light caused by a touch on the display region, wherein the first photosensor member comprises at least one photo transistor having a gate, a source and a drain, and is characterized with a sensitivity for sensing the change of the incident light, wherein the sensitivity varies with an intensity of ambient light and a voltage difference, Vgs, between the gate and the source of the at least one photo transistor, such that for each intensity value of the ambient light, there is a corresponding value of the voltage difference Vgs for the first photosensor member to operate at an optimal sensitivity, wherein Vgs=(Vg−Vs), Vg and Vs being voltages respectively applied to the gate and the source of the at least one photo transistor;
   (c) a second photosensor member formed in the peripheral region for measuring the intensity of the ambient light and generating an ambient light sensing signal corresponding to the measured intensity of the ambient light; and
   (d) a lookup table (LUT) stored in a memory device, containing a number of intensity values of the ambient light, and corresponding values of the voltage difference Vgs for the first photosensor member to operate at the optimal sensitivity; and
   (e) a sensor controller electrically coupled to the first photosensor member and the second photosensor member and in communication with the memory device, adapted for receiving the ambient light sensing signal from the second photosensor member, looking up a value of the voltage difference Vgs corresponding to the received ambient light sensing signal from the LUT, and regulating the voltages Vg and Vs respectively applied to the gate and the source of the at least one photo transistor of the first photosensor member according to the looked-up value of the voltage difference Vgs, so as to operate the first photosensor member at the optimal sensitivity.

2. The LCD of claim 1, wherein the first photosensor member further comprises:
 (a) at least one storage capacitor Cst1 having a first terminal and a second terminal electrically coupled to the source and the drain of the at least one photo TFT, respectively, for storing charges generated by the at least one photo TFT responsive to an amount of the incident light; and
 (b) at least one readout TFT having a gate, a source and a drain electrically coupled to a gate line, the drain of the at least one photo TFT, and a readout line, respectively, for outputting a signal corresponding to the charges stored in the at least one storage capacitor Cst1.

3. The LCD of claim 1, wherein the at least one photo transistor comprises a thin film transistor (TFT).

4. The LCD of claim 1, wherein the first photosensor member is operably switchable between a reflective mode of operation and a shadow mode of operation according to the ambient light sensing signal generated by the second photosensor member.

5. The LCD of claim 4, wherein when the measured intensity of the ambient light is substantially less than a threshold, the first photosensor member is configured to operate in the reflective mode of operation, and wherein when the measured intensity of the ambient light is substantially greater than the threshold, the first photosensor member is configured to operate in the shadow mode of operation.

6. The LCD of claim 5, further comprising a backlight for illuminating the display region of the panel.

7. The LCD of claim 6, further comprising a backlight controller electrically coupled to the backlight and the second photosensor member for controlling the luminance of the backlight, wherein the backlight controller is configured such that when the measured intensity of the ambient light is substantially equal to the threshold, the luminance of the backlight is increased to a level so that the first photosensor member operates in the reflective mode of operation.

8. The LCD of claim 1, wherein the second photosensor member comprises one or more amorphous silicon thin film transistors or photodiodes.

9. A method for driving a liquid crystal display (LCD), comprising the steps of:
 (a) providing an LCD comprising:
  (i) a panel having a display region and a peripheral region that is adjacent the display region, the panel having a plurality of pixels spatially arranged in the form of a matrix in the display region for displaying an image;
  (ii) a first photosensor member formed in the display region for sensing a change of incident light caused by a touch on the display region, wherein the first photosensor member comprises at least one photo transistor having a gate, a source and a drain, and is characterized with a sensitivity for sensing the change of the incident light, wherein the sensitivity varies with an intensity of ambient light and a voltage difference, Vgs, between the gate and the source of the at least one photo transistor, such that for each intensity value of the ambient light, there is a corresponding value of the voltage difference Vgs for the first photosensor member to operate at an optimal sensitivity, wherein Vgs=(Vg−Vs), Vg and Vs being voltages respectively applied to the gate and the source of the at least one photo transistor;
  (iii) a second photosensor member formed in the peripheral region;
  (iv) a lookup table (LUT) stored in a memory device, containing a number of intensity values of the ambient light, and corresponding values of the voltage difference Vgs for the first photosensor member to operate at the optimal sensitivity; and
  (v) a sensor controller electrically coupled to the first photosensor member and the second photosensor member and in communication with the memory device;
 (b) measuring the intensity of ambient light and generating an ambient light sensing signal corresponding to the measured intensity of the ambient light by the second photosensor member;
 (c) receiving the ambient light sensing signal from the second photosensor member by the sensor controller;
 (d) regulating the voltages Vg and Vs according to the received ambient light sensing signal by the sensor controller; and
 (d) applying the regulated voltages Vg and Vs respectively to the gate and the source of the at least one photo transistor of the first photosensor member, so as to operate the first photosensor member at the optimal sensitivity.

10. The method of claim 9, wherein the regulating step comprises the steps of:
 (a) looking up a value of the voltage difference Vgs corresponding to the received ambient light sensing signal from the LUT by the sensor controller; and
 (b) regulating the voltages Vg and Vs according to the looked-up value of the voltage difference Vgs.

11. A method for driving a display device having a panel having a display region and a peripheral region, a first photosensor member comprising at least one photo transistor having a gate, a source and a drain, characterized with a sensitivity for sensing a change of an incident light, and formed in the display region, and a second photosensor member formed in the peripheral region, comprising the steps of:
 (a) providing a lookup table (LUT) containing a number of intensity values of ambient light, and corresponding values of a voltage difference, Vgs, between the gate and the source of the at least one photo transistor for the first photosensor member to operate at the optimal sensitivity, wherein the voltage difference Vgs=(Vg−Vs), Vg and Vs being voltages respectively applied to the gate and the source of the at least one photo transistor;
 (b) measuring an intensity of ambient light by the second photosensor member; and
 (c) driving the first photosensor member to operate at the optimal sensitivity according to the measured intensity of the ambient light, so as to sense the change of the incident light caused by a touch on the display region.

12. The method of claim 11, wherein the driving step comprises the steps of:
 (a) looking up a value of the voltage difference Vgs corresponding to the measured intensity of the ambient light from the LUT;
 (b) regulating the voltages Vg and Vs according to the looked-up value of the voltage difference Vgs; and (c) applying the regulated voltages Vg and Vs respectively to the gate and the source of the at least one photo transistor of the first photosensor member, so as to operate the first photosensor member at the optimal sensitivity.

13. The method of claim 11, wherein the first photosensor member is operably switchable between a reflective mode of operation and a shadow mode of operation according to the measured intensity of the ambient light, and wherein the first photosensor member is initially in the shadow mode of operation.

14. The method of claim 13, wherein the driving step comprises the step of comparing the measured intensity of the ambient light with a threshold.

15. The method of claim 14, wherein when the measured intensity of the ambient light is substantially greater than the threshold, the driving step further comprises the steps of:
   (a) looking up a value of the voltage difference Vgs corresponding to the measured intensity of the ambient light from the LUT;
   (b) regulating the voltages Vg and Vs according to the looked-up value of the voltage difference Vgs; and
   (c) applying the regulated voltages Vg and Vs respectively to the gate and the source of the at least one photo transistor of the first photosensor member, so as to operate the first photosensor member with an optimal sensitivity.

16. The method of claim 14, wherein when the measured intensity of the ambient light is substantially less than the threshold, the driving step further comprises the steps of:
   (a) switching the first photosensor member to the reflective mode of operation;
   (b) looking up a value of the voltage difference Vgs corresponding to the measured intensity of the ambient light from the LUT;
   (c) regulating the voltages Vg and Vs according to the looked-up value of the voltage difference Vgs; and
   (d) applying the regulated voltages Vg and Vs respectively to the gate and the source of the at least one photo transistor of the first photosensor member, so as to operate the first photosensor member at the optimal sensitivity.

17. The method of claim 14, wherein when the measured intensity of the ambient light is substantially equal to the threshold, the driving step further comprises the steps of:
   (a) increasing the luminance of backlight a desired level;
   (b) switching the first photosensor member to the reflective mode of operation;
   (c) looking up a value of the voltage difference Vgs corresponding to the measured intensity of the ambient light from the LUT;
   (d) regulating the voltages Vg and Vs according to the looked-up value of the voltage difference Vgs; and
   (e) applying the regulated voltages Vg and Vs respectively to the gate and the source of the at least one photo transistor of the first photosensor member, so as to operate the first photosensor member at the optimal sensitivity.

* * * * *